United States Patent [19]

Hasler

[11] Patent Number: 4,667,745
[45] Date of Patent: May 26, 1987

[54] HAND PROPELLED ROTARY CULTIVATOR

[76] Inventor: Ross E. Hasler, 9502 Maryland Drive, Sidney, B. C., Canada, V8L 2R6

[21] Appl. No.: 846,862

[22] Filed: Apr. 1, 1986

[30] Foreign Application Priority Data

Dec. 10, 1985 [CA] Canada ............................. 478107

[51] Int. Cl.⁴ .............................................. A01B 33/02
[52] U.S. Cl. ........................................ 172/42; 172/96
[58] Field of Search ................. 172/15, 21, 41, 42, 172/43, 45, 76, 96, 258, 536

[56] References Cited

U.S. PATENT DOCUMENTS

| | | | |
|---|---|---|---|
| 2,438,707 | 3/1948 | Kropp | 172/96 |
| 2,902,098 | 9/1959 | Grunder | 172/21 |
| 3,031,830 | 5/1962 | Smith et al. | 172/15 X |
| 3,086,596 | 4/1963 | Allegretti et al. | 172/15 |
| 3,460,629 | 8/1969 | Shapland, Jr. et al. | 172/21 |
| 3,960,231 | 6/1976 | McCormick | 172/258 X |
| 4,276,940 | 7/1981 | Kirkegaard | 172/42 |

FOREIGN PATENT DOCUMENTS

| | | |
|---|---|---|
| 1023190 | 12/1977 | Canada . |
| 1174507 | 9/1984 | Canada . |
| 516115 | 1/1931 | Fed. Rep. of Germany ........ 172/42 |

Primary Examiner—Richard T. Stouffer
Attorney, Agent, or Firm—H. Albert Richardson, Jr.

[57] ABSTRACT

A hand propelled device for lightly cultivating and mulching soil and typically for use in the home garden. The device includes a frame, a motor, and a hub assembly connected to the motor and also mounted to the frame. The hub assembly includes a shaft, a pair of hubs spaced apart on the shaft, and a plurality of beater wires pivotally mounted to each hub at radially spaced points near its outer circumference. The cultivator is supported by a single wheel mounted for free rotation between the hubs.

7 Claims, 3 Drawing Figures

U.S. Patent      May 26, 1987      4,667,745
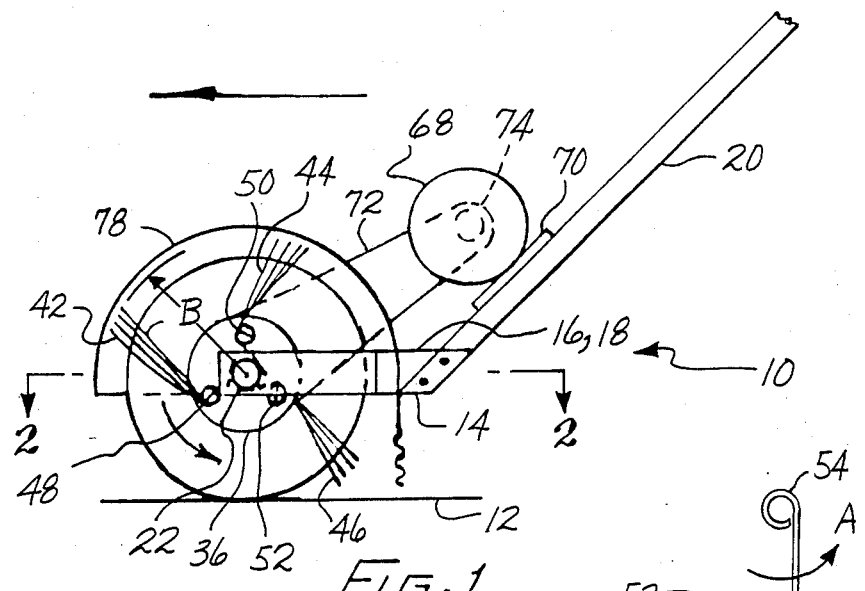
FIG. 1
FIG. 3
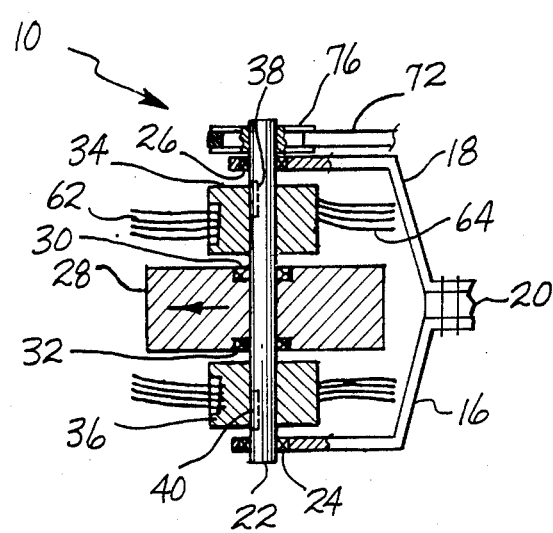
FIG. 2

HAND PROPELLED ROTARY CULTIVATOR

BACKGROUND OF THE INVENTION

This invention generally relates to powered gardening tools and more particularly to a hand propelled rotary cultivator for light cultivating and mulching.

In caring for a garden during the growing season it is necessary to periodically remove weeds and lightly cultivate the soil near the surface to provide adequate oxygen for the plants. Traditionally these operations have been performed with a common garden hoe. In recent years numerous devices powered either by electric or internal combustion motors have been introduced to assist the gardener, but for various reasons most have proved unsatisfactory. One problem with many of them is that due to the weight of the motors and other mechanisms they are rather heavy, but yet are hand held and must be supported entirely by the operator. Devices of this sort are particularly unsatisfactory for use by older persons.

Another problem with cultivators of this type is that they are difficult to control with any precision. As a result the depth of cultivation must be closely monitored and the operator must be careful not to operate the device very close to plants. In some situations the cultivator can even pose a danger to the operator.

Accordingly, it is an object of this invention to provde for a powered rotary cultivator which is substantially self-supporting.

It is another object of this invention to provide for a cultivator which is easily controllable, permitting the operator to cultivate or mulch relatively close to plants without endangering them.

It is yet another object of this invention to provide for such a cultivator which permits closer control of the depth of cultivation than devices previously known.

SUMMARY OF THE INVENTION

This invention can be broadly summarized as a hand propelled rotary cultivator including a frame, a power means such as an electric motor, a hub assembly mounted to the frame, connected to the power means, and including a hub, a plurality of beater wires pivotally connected to the hub, and a support wheel mounted to the frame for rotation independent of the hub assembly.

The invention can also be summarized as a cultivator including a frame, a hub assembly rotatably mounted to the frame and including a shaft, a hub mounted on the shaft and a number of beater wires which extend from the hub. Also included is a support wheel mounted to the shaft for rotation independently of the hub assembly and power means attached to the frame for rotating the hub assembly.

In accordance with a yet more detailed aspect of the invention the frame has a pair of opposing arms and includes a handle by which the device can be propelled. The shaft extends between and is rotatably mounted to each of the arms and a pair of hubs are spaced apart and fixedly mounted on the shaft. A plurality of beater wires are pivotally mounted at radially spaced points and, when extended in operating position, define by their tips a circle. A support wheel having a diameter less than the diameter of the circle so defined by the beater wire tips is mounted on a shaft between the hubs for free rotation. Finally, power means is mounted on the frame for rotating the shaft.

BRIEF DESCRIPTION OF THE DRAWINGS

FIG. 1 is a side view of the disclosed cultivator.

FIG. 2 is a sectional view of the subject invention taken at 2—2 in FIG. 1.

FIG. 3 is a side view of a typical beater wire.

DESCRIPTION OF THE PREFERRED EMBODIMENT

The novel features believed to be characteristic of this invention are set forth in the appended claims. The invention itself, however, may be best understood and its various objects and advantages best appreciated by reference to the detailed description below in connection with the accompanying drawings.

In FIGS. 1 through 3 of those drawings a cultivator constructed in accordance with the teachings of the present invention is illustrated and generally designated by the number 10. FIG. 1 shows the cultivator as it would appear in normal operation travelling along a level surface of ground 12.

The major components of the cultivator are mounted on fork-shaped frame 14 which includes a pair of spaced arms 16 and 18 and a handle section 20. A T-shaped handlebar (not shown) is located at the upper end of the handle section.

Extending between arms 16 and 18 is shaft 22 which is mounted for rotation in the arms by means of bearings 24 and 26 as shown in FIG. 2. Support wheel 28 is mounted on the shaft for free rotation by means of bearings 30 and 32 and is centrally located between the arms. In the preferred embodiment a rubber-tired wheel having a diameter of approximately 5 and $\frac{3}{4}$ inches was employed. The primary purpose of the wheel is to support the majority of the weight of the cultivator and to provide ease of maneuverability. Hubs 34 and 36, located on opposite sides of the support wheel, are fixed to shaft 22 by keys 38 and 40, respectively. In the preferred embodiment the hubs are made of plastic to minimize weight.

Three groups, 42, 44 and 46, of six beater wires each are attached to hub 36 by means of removeable pins 48, 50 and 52, respectively. Each of the beater wires is free to rotate independently of the others to the degree limited by the contours of the hub recesses in which they are mounted. FIG. 3 illustrates a typical beater wire 53 which is preferrably made of stainless steel wire. It has a formed loop 54 in one end, a straight main shaft 56, a tip section 58 and a tip 60. The inventor has determined that the beater wires function best if the tip section is bent so as to intersect the main section at an angle $\alpha$ of approximately 150°. The beater wire shown in FIG. 3 would be mounted so as to rotate in the direction indicated by arrow A. Identical groups of beater wires 62, 64 and 66 (not shown) are mounted on hub 34.

As the beater wires rotate with hubs they are forced outward by centrifugal force into an extended operating position as shown in FIG. 1. In that position the radius of the circular path of the tips of the wires, distance B, is approximately $\frac{3}{4}$ inch greater than the radius of support wheel 28. Accordingly, the maximum depth of cultivation will be approximately $\frac{3}{4}$ of an inch. Obviously, the cultivation depth could be varied by installing beater wires of a different length. One advantage provided by this invention is that the depth of cultivation is relatively well controlled. Another advantage is that the beater wires can easily be removed should they need to be replaced.

Rotational power is supplied to shaft 22 and the hubs by conventional 115 volt AC motor 68 which is mounted to handle section 20 by bracket 70. Power is transmitted to the shaft by means of flat drive belt 72 which extends between pulleys 74 and 76. In the preferred embodiment the motor rotates in a no load speed of 3600 rpm and the shaft speed is reduced to 1200 rpm. Obviously, other power sources such as an internal combustion engine could be substituted for the electric motor. Finally, in order to minimize the distance which dirt particles or other objects truck by the beater wires might be thrown and to protect the operator both hubs are partially enclosed by a cylindrical shield 78 which is mounted to the frame and preferably made of high-impact plastic.

Thus, it can be seen that the present invention provides for a hand propelled rotary cultivator which incorporates many novel features and offers significant advantages over the prior art. Although only one embodiment of this invention has been illustrated and described, it is to be understood that obvious modifications can be made of it without departing from the true spirit and scope of the invention.

I claim:

1. A hand propelled rotary cultivator for light cultivation, mulching and the like comprising:
   a frame;
   a hub assembly rotatably mounted to the frame and including a shaft, a pair of hubs mounted on the shaft and a plurality of beater wires extending from each of the hubs;
   a support wheel mounted on the shaft between the hubs for rotation independently of the hub assembly; and,
   power means attached to the frame for rotating the hub assembly.

2. The cultivator of claim 1 wherein the frame includes a pair of opposing arms and wherein the shaft extends between the arms.

3. The cultivator of claim 1 wherein the hubs are fixedly mounted on the shaft and the shaft is mounted for rotation in the frame.

4. The cultivator of claim 1 wherein the beater wires are pivotally mounted at radially spaced points on each of the hubs and have an extended operating position and tips which, in such operating position, define a circle larger in diameter than the diameter of the support wheel.

5. The cultivator of claim 1 wherein the power means includes an electric motor.

6. A hand propelled rotary cultivator for light cultivation, mulching and the like comprising:
   a frame having a pair of opposing arms and a handle;
   a hub assembly including a shaft extending between and rotatably mounted to each of said arms, a pair of hubs spaced apart and fixedly mounted on the shaft, and a plurality of beater wires pivotally mounted at radially spaced points on each of the hubs and having an extended operating position and tips which, in such operating position, define a circle;
   a support wheel mounted on the shaft between the hubs for free rotation and having a diameter less than the diameter of the circle so defined; and,
   power means mounted on the frame for rotating the shaft.

7. The cultivator of claim 6 wherein each beater wire includes a main shaft defining a first line and a tip section defining a second line, which lines intersect at an obtuse angle.

* * * * *